US012613115B2

(12) United States Patent
Li et al.

(10) Patent No.: US 12,613,115 B2
(45) Date of Patent: Apr. 28, 2026

(54) METHOD, USE, AND DEVICE FOR ULTRASONIC DOUBLE-WAVE MEASUREMENT OF PRE-TIGHTENING FORCE AND TEMPERATURE OF SOLID MATERIAL

(71) Applicant: LVYIN TECHNOLOGY (WUHAN) CO., LTD., Wuhan (CN)

(72) Inventors: Kun Li, Wuhan (CN); Xuxiang Zhu, Wuhan (CN); Yuping Shen, Wuhan (CN)

(73) Assignee: LVYIN TECHNOLOGY (WUHAN) CO., LTD., Wuhan (CN)

( * ) Notice: Subject to any disclaimer, the term of this patent is extended or adjusted under 35 U.S.C. 154(b) by 332 days.

(21) Appl. No.: 18/291,688

(22) PCT Filed: Nov. 12, 2021

(86) PCT No.: PCT/CN2021/130376
§ 371 (c)(1),
(2) Date: Jan. 24, 2024

(87) PCT Pub. No.: WO2023/005061
PCT Pub. Date: Feb. 2, 2023

(65) Prior Publication Data
US 2024/0240976 A1 Jul. 18, 2024

(30) Foreign Application Priority Data
Jul. 29, 2021 (CN) .......................... 202110864700.5

(51) Int. Cl.
| | |
|---|---|
| *G01D 21/02* | (2006.01) |
| *G01K 11/24* | (2006.01) |
| *G01L 1/25* | (2006.01) |

(52) U.S. Cl.
CPC ............. *G01D 21/02* (2013.01); *G01K 11/24* (2013.01); *G01L 1/255* (2013.01)

(58) Field of Classification Search
CPC ......... G01D 21/02; G01K 11/24; G01L 1/255
(Continued)

(56) References Cited

U.S. PATENT DOCUMENTS

| | | | | |
|---|---|---|---|---|
| 5,381,230 A | * | 1/1995 | Blake ................... | G02B 6/2843 |
| | | | | 372/32 |
| 2019/0203599 A1 | | 7/2019 | Sun et al. | |

(Continued)

FOREIGN PATENT DOCUMENTS

| | | |
|---|---|---|
| CN | 102636307 A | 8/2012 |
| CN | 108387338 A | 8/2018 |

(Continued)

*Primary Examiner* — Peter J Macchiarolo
*Assistant Examiner* — Rodney T Frank
(74) *Attorney, Agent, or Firm* — SZDC Law PC

(57) ABSTRACT

A method for the ultrasonic double-wave measurement includes: obtaining a first mode wave time-of-flight and a second mode wave time-of-flight of an ultrasonic double-wave of a solid material at a first temperature and stress state; measuring a first mode wave time and a second mode wave time of the ultrasonic double-wave of the solid material in an unknown state; obtaining a first mode wave temperature influence coefficient and a second mode wave temperature influence coefficient of the solid material, and a first mode wave pre-tightening force influence coefficient and a second mode wave pre-tightening force influence coefficient in the solid material to be measured having the same specification and geometric shape; and obtaining a relative change relationship of ultrasonic double-wave time-of-flight according to the first-order or second-order Taylor approximation, and jointly solving to obtain a measured pre-tightening force and a measured temperature.

10 Claims, 4 Drawing Sheets

(58) Field of Classification Search
USPC .......................................................... 73/597
See application file for complete search history.

(56)                    References Cited

U.S. PATENT DOCUMENTS

| | | | |
|---|---|---|---|
| 2020/0173963 | A1 | 6/2020 | Horing |
| 2020/0278240 | A1 | 9/2020 | Sun et al. |

FOREIGN PATENT DOCUMENTS

| | | | |
|---|---|---|---|
| CN | 110530571 | A | 12/2019 |
| CN | 111537132 | A | 8/2020 |
| CN | 111693190 | A | 9/2020 |
| CN | 112577653 | A | 3/2021 |
| CN | 113587992 | A | 11/2021 |
| EP | 1754051 | B1 | 1/2016 |
| JP | 2001174343 | A | 6/2001 |
| JP | 2002277336 | A | 9/2002 |

* cited by examiner

METHOD, USE, AND DEVICE FOR ULTRASONIC DOUBLE-WAVE MEASUREMENT OF PRE-TIGHTENING FORCE AND TEMPERATURE OF SOLID MATERIAL

This application is the National Stage Application of PCT/CN2021/130376, filed on Nov. 12, 2021, which claims priority to Chinese Patent Application No. 202110864700.5, filed on Jul. 29, 2021, which is incorporated by reference for all purposes as if fully set forth herein.

TECHNICAL FIELD

The present disclosure relates to the technical field of ultrasonic double-wave measurement, specifically relates to a method, use, and device for ultrasonic double-wave measurement of a pre-tightening force and temperature of a solid material, and is particularly suitable for patrol inspections of bolt axial force.

BACKGROUND

A method of ultrasonic monitoring and detecting pre-tightening force of a solid material (such as bolts and metal) is to emit ultrasonic waves into the solid material, measure a time-of-flight difference of the ultrasonic waves, and deduce changes in the pre-tightening force of the solid material. The changes in the ultrasonic time-of-flight difference are easily affected by a temperature of the solid material and temperature non-uniformity.

Taking wind power bolts as an example, detection and monitoring of pre-tightening force of the wind power bolts are important means to ensure safety of wind turbine blades and tower barrels. The monitoring and detection of the pre-tightening force of the wind power bolts usually use a method of ultrasonic measurement of time-of-flight combined with a platinum rhodium temperature sensor Pt1000 to measure a temperature at certain points on the bolts, and use this measured temperature value to compensate for the changes of ultrasonic sound velocity with the temperature. Due to the uneven temperature on site, the temperature of the bolts themselves is uneven, making it difficult to precisely measure the average temperature of the bolts through a single point of a thermometer, which is prone to leading to temperature compensation errors in measuring the pre-tightening force. For example, for wind turbine tower barrel anchor bolts that are several meters long, an environmental difference between an exposed part of the ground and an underground part may cause a very uneven temperature throughout the length of the anchor bolts. For another example, internal bolts of a wind turbine tower barrel may experience uneven temperature distribution throughout the entire bolts due to different positions of sunlight exposure outside the tower barrel and uneven directions of thermal radiation during running of electrical appliances inside the tower barrel.

The ultrasonic patrol detection of the pre-tightening force of the wind power bolts is usually a lower cost method than ultrasonic online monitoring of the pre-tightening force of the bolts. However, this method requires the average temperature of the bolts to be recorded every time when the pre-tightening force of the bolts is measured to compensate for a measurement value of the pre-tightening force of the bolts. However, an existing method cannot quickly obtain the average temperature of the bolts, which is very inconvenient in practical applications.

The ultrasonic measurement method for online monitoring of the pre-tightening force of the wind power bolts usually uses a piezoelectric single-wave probe, with each bolt equipped with one probe and each probe requiring a thermometer. This increases the complexity of an ultrasonic monitoring device for the pre-tightening force of the bolts, and the equipped thermometer can usually only measure the temperature at certain points on the bolts, and cannot obtain the average temperature of the entire bolts, while the average temperature is the accurate temperature required for calculating temperature compensation. Once the bolts are in an environment with rapid temperature changes, the temperature on the bolts will become very uneven, and the measurement errors of the thermometer will also increase.

The invention patent with a publication patent number CN 111693190 A discloses an ultrasonic-based axial stress measurement apparatus for bolts, including an ultrasonic measurement apparatus, measuring a time-of-flight difference of ultrasonic waves in the bolts; a temperature measurement module, measuring a bolt temperature; a coefficient calibration module, measuring the time-of-flight difference of ultrasonic waves at least three times through the ultrasonic measurement apparatus and the temperature measurement module, and determining a coefficient according to a matrix formula; and a microprocessor, determining a function relationship of the bolt temperature, an axial stress, and the time-of-flight difference according to the coefficient, and determining a current axial stress of the bolts based on the function relationship. This method uses ultrasonic single waves for measurement, measures the time-of-flight difference of the ultrasonic waves at least three times, and requires multiple measurements of bolt temperature, which is relatively high in complexity and high in cost.

SUMMARY

Aiming at the technical problems above, an objective of the present disclosure is to provide a method, use and device for ultrasonic double-wave measurement of a pre-tightening force and temperature of a solid material. The pre-tightening force and the temperature of the solid material are measured simultaneously by directly using only ultrasonic method, excluding the influence of overall temperature changes and uneven temperature changes on pre-tightening force measurement. There is no need to use an additional temperature sensor to measure the temperature of the solid material for compensation, thus avoiding introduction of temperature measurement errors caused by temperature sensor measurement errors and uneven temperature of the solid material into pre-tightening force measurement errors, which greatly improves the speed and convenience of ultrasonic inspection of the pre-tightening force of a solid material. At the same time, the present disclosure also uses a single ultrasonic method to accurately replace a traditional thermometer in measuring the solid temperature.

The technical solution of the present disclosure is as follows:

a method for ultrasonic double-wave measurement of a pre-tightening force and temperature of a solid material, including the following steps:

S01: obtaining a temperature $T_0$ and pre-tightening force $F_0$ of a solid material in a first state, and a first mode wave time-of-flight $T_{S0}$ and a second mode wave time-of-flight $T_{L0}$ of an ultrasonic double-wave in this state;

S02: measuring a first mode wave time $T_S$ and a second mode wave time $T_L$ of the ultrasonic double-wave of the solid material in an unknown state;

S03: obtaining a first mode wave temperature influence coefficient $K_{TS}$ and a second mode wave temperature influence coefficient $K_{TL}$ of the solid material, and a first mode wave pre-tightening force influence coefficient $K_{FS}$ and a second mode wave pre-tightening force influence coefficient $K_{FL}$ in the solid material to be measured having the same specification and geometric shape; and

S04: obtaining a relative change relationship of ultrasonic double-wave time-of-flight according to the first-order Taylor approximation as:

$$(T_S - T_{S0})/T_{S0} = K_{TS} \cdot (T - T_0) + K_{FS} \cdot (F - F_0) \qquad \text{(I)}$$

$$(T_L - T_{L0})/T_{L0} = K_{TL} \cdot (T - T_0) + K_{FL} \cdot (F - F_0) \qquad \text{(II)}$$

wherein, F is the measured pre-tightening force, and T is the measured temperature;

jointly solving the measured pre-tightening force F by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

and
solving the measured temperature T:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

In a preferred technical solution, after step S04, the method further includes:

S05: obtaining another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape;

S06: obtaining a relative change relationship of the ultrasonic double-wave time-of-flight according to the second-order Taylor approximation as:

$$(T_S - T_{S0})/T_{S0} = K_{TS} \cdot (T - T_0) + K_{FS} \cdot (F - F_0) + K_{FS2} \cdot (F - F_0)^2 \qquad \text{(III)}$$

$$\begin{aligned}(T_L - T_{L0})/T_{L0} = \\ K_{TL} \cdot (T - T_0) + K_{TL2} \cdot (T - T_0) + K_{FL} \cdot (F - F_0) + + K_{FL2}(F - F_0)^2;\end{aligned} \qquad \text{(IV)}$$

and
S07: jointly solving the measured pre-tightening force F and the measured temperature T by means of formulas (III) and (IV).

In a preferred technical solution, the first mode wave and the second mode wave are shear wave, longitudinal wave, surface wave, guided wave, creeping wave or combination waves of any two modes above.

In a preferred technical solution, data in step S01 is obtained through measurement or by searching for recorded data.

In a preferred technical solution, data in step S03 and step S05 is obtained by searching a calibration database.

The above method for the ultrasonic double-wave measurement of the pre-tightening force and the temperature of the solid material is used for regular patrol ultrasonic inspection of pre-tightening force of high-strength bolts, and measuring the pre-tightening force and/or temperature of the bolts.

The above method for the ultrasonic double-wave measurement of the pre-tightening force and the temperature of the solid material is used for measuring, in a free tensile state, the axial average temperature of metal in a high-temperature state.

Using the above method for the ultrasonic double-wave measurement of the pre-tightening force and the temperature of the solid material for online monitoring of axial force of the bolts may omit one platinum rhodium thermometer for each online monitoring ultrasonic probe.

The method for the ultrasonic double-wave measurement of the pre-tightening force and the temperature of the solid material is used for measuring axial average pre-tightening force and an axial average temperature of a pressure vessel shell, and then calculating an internal temperature of a pressure vessel.

The present disclosure further discloses a device for ultrasonic double-wave measurement of a pre-tightening force and temperature of a solid material, including:

a data obtaining/measuring module, configured to obtain a temperature $T_0$ and pre-tightening force $F_0$ of a solid material in the first state, and a first mode wave time-of-flight $T_{S0}$ and a second mode wave time-of-flight $T_{L0}$ of an ultrasonic double-wave in this state;

a measuring module, configured to measure the first mode wave time $T_S$ and the second mode wave time $T_L$ of the ultrasonic double-wave of the solid material in an unknown state;

a parameter obtaining module, configured to obtain the first mode wave temperature influence coefficient $K_{TS}$ and the second mode wave temperature influence coefficient $K_{TL}$ of the solid material, and the first mode wave pre-tightening force influence coefficient $K_{FS}$ and the second mode wave pre-tightening force influence coefficient $K_{FL}$ in the solid material to be measured having the same specification and geometric shape; and a modeling and calculating module, configured to obtain a relative change relationship of ultrasonic double-wave time-of-flight according to the first-order Taylor approximation as:

$$(T_S - T_{S0})/T_{S0} = K_{TS} \cdot (T - T_0) + K_{FS} \cdot (F - F_0) \qquad \text{(I)}$$

$$(T_L - T_{L0})/T_{L0} = K_{TL} \cdot (T - T_0) + K_{FL} \cdot (F - F_0) \qquad \text{(II)}$$

wherein, F is the measured pre-tightening force, and T is the measured temperature;

jointly solve the measured pre-tightening force F by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

5 and
solve the measured temperature T:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

In a preferred technical solution, the device further includes a precision improving module, including:

a second parameter obtaining module, configured to obtain another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape;

a second modeling and calculating module, configured to obtain a relative change relationship of ultrasonic double-wave time-of-flight according to the second-order Taylor approximation as:

$$(T_S - T_{S0})/T_{S0} = \tag{III}$$

$$K_{TS} \cdot (T - T_0) + K_{TS2} \cdot (T - T_0)^2 + K_{FS} \cdot (F - F_0) + K_{FS2} \cdot (F - F_0)^2$$

$$(T_L - T_{L0})/T_{L0} = \tag{IV}$$

$$K_{TL} \cdot (T - T_0) + K_{TL2} \cdot (T - T_0)^2 + K_{FL} \cdot (F - F_0) + K_{FL2} \cdot (F - F_0)^2$$

a joint solving module, configured to jointly solve the measured pre-tightening force F and the measured temperature T by means of formulas (III) and (IV).

In a preferred technical solution, the first mode wave and the second mode wave are shear wave, longitudinal wave, surface wave, guided wave, creeping wave or combination waves of any two modes above.

In a preferred technical solution, data in the data obtaining/measuring module is obtained through measurement or by searching for recorded data.

Compared with the prior art, the advantages of the present disclosure are as follows:

1. The method for the ultrasonic double-wave measurement of the pre-tightening force and the temperature of the solid material of the present disclosure may simultaneously obtain the changes in the pre-tightening force and the average temperature only by using a double-wave time-of-flight measured in a current state, the time-of-flight in a comparing state and some constants, which is simple in calculation method and high in efficiency, and has a wide range of applications. The pre-tightening force and the temperature of the bolts are measured simultaneously by directly using only ultrasonic method through algorithms, excluding the influence of overall temperature changes and uneven temperature changes on pre-tightening force measurement. There is no need to use the additional temperature sensor to measure the temperature of the bolts for compensation, thus avoiding introduction of temperature measurement errors caused by temperature sensor measurement errors and uneven temperature of the bolts into pre-tightening force measurement errors.

2. When temperature measurement becomes a target, the present disclosure also provides a method for suppressing influence of a stress state on temperature measurement. This method may be extended to objects or materials other than the bolts, to use only the ultrasonic single-type method to measure the temperature of a sample.

3. When it is necessary to simultaneously measure the average axial pre-tightening force and the average temperature of the bolts, this method provides a reliable ultrasonic means to simultaneously measure the average axial pre-tightening force and average the temperature of the bolts. This method is also applicable to other objects that can propagate the ultrasonic waves, for example, the ultrasonic double-wave method provided by the present disclosure can be used for simultaneously measuring the average temperature and the average axial force of the pressure vessel shell at a certain moment. When an appropriate axial stress model and temperature gradient model are used for the pressure vessel shell, the ultrasonic single-type method provided by the present disclosure can simultaneously measure the temperature and pressure inside the pressure vessel with high precision.

BRIEF DESCRIPTION OF FIGURES

The present disclosure is further described below in conjunction with accompanying drawings and embodiments.

DETAILED DESCRIPTION

In order to make the objective, technical solution, and advantages of the present disclosure clearer, the present disclosure is further illustrated below in conjunction with specific implementations and with reference to accompanying drawings. It should be understood that these descriptions are only exemplary and not intended to limit the scope of the present disclosure. Furthermore, in the following explanation, the description of the well-known structure and technology is omitted to avoid unnecessary confusion with the concepts of the present disclosure.

Figure 1:
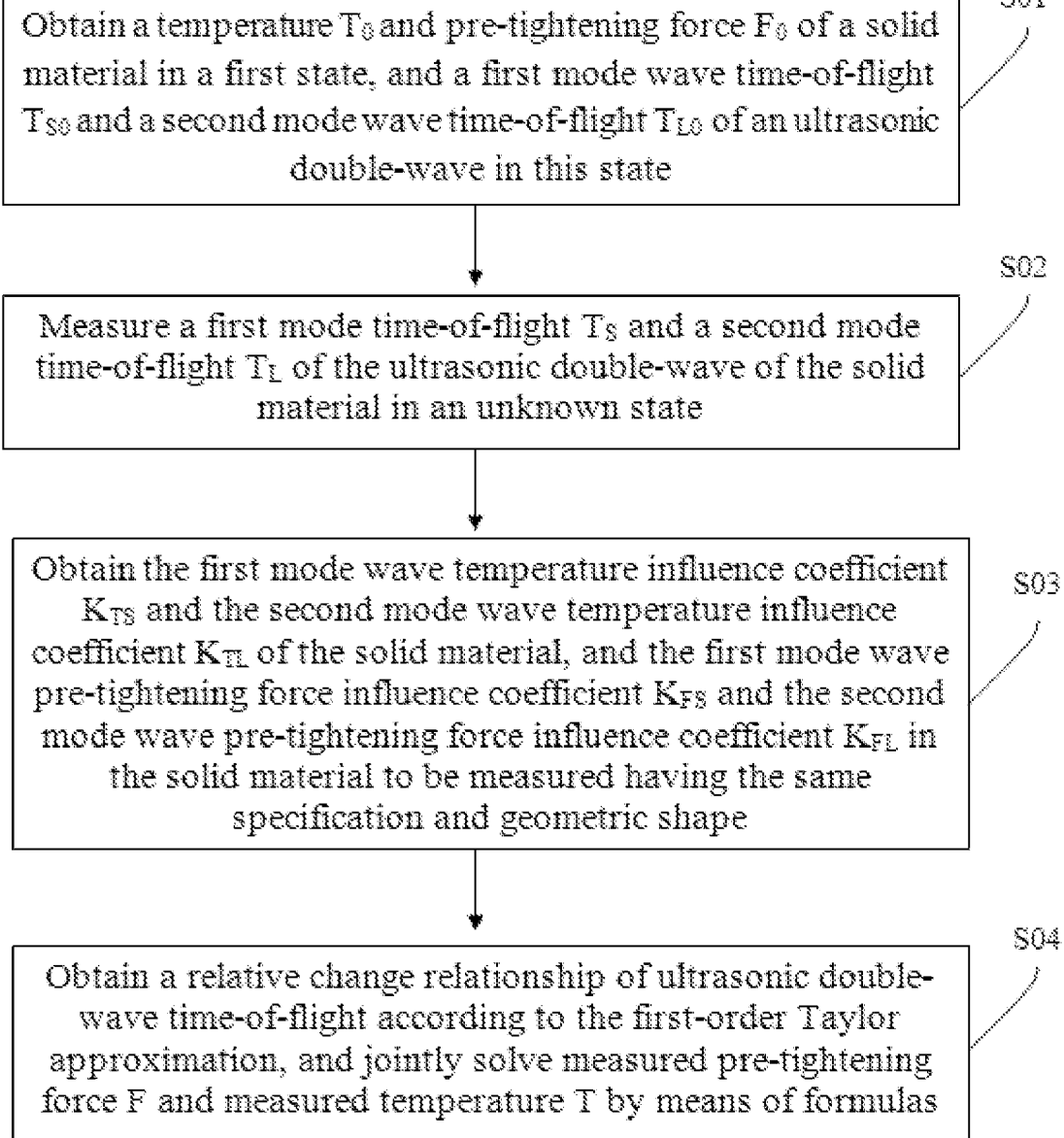
FIG. 1 is a flow diagram of a method for ultrasonic double-wave measurement of a pre-tightening force and temperature of a solid material of the present disclosure.

As shown in FIG. 1, a method for ultrasonic double-wave measurement of a pre-tightening force and temperature of a solid material, includes the following steps:

S01: a temperature $T_0$ and pre-tightening force $F_0$ of a solid material in a first state, and a first mode wave time-of-flight $T_{S0}$ and a second mode wave time-of-flight $T_{L0}$ of an ultrasonic double-wave in this state are obtained;

S02: a first mode wave time $T_S$ and a second mode wave time $T_L$ of the ultrasonic double-wave of the solid material in an unknown state are measured;

S03: a first mode wave temperature influence coefficient $K_{TS}$ and a second mode wave temperature influence coefficient $K_{TL}$ of the solid material, and a first mode wave pre-tightening force influence coefficient $K_{FS}$ and a second mode wave pre-tightening force influence coefficient $K_{FL}$ in the solid material to be measured having the same specification and geometric shape are obtained; and S04: a relative change relationship of ultrasonic double-wave time-of-flight is obtained according to the first-order Taylor approximation as:

$$(T_S - T_{S0})/T_{S0} = K_{TS} \cdot (T - T_0) + K_{FS} \cdot (F - F_0)) \qquad \text{(I)}$$

$$(T_L - T_{L0})/T_{L0} = K_{TL} \cdot (T - T_0) + K_{FL} \cdot (F - F_0)) \qquad \text{(II)}$$

wherein, F is the measured pre-tightening force, and T is the measured temperature;

the measured pre-tightening force F is jointly obtained by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

and the measured temperature T is solved:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

In a preferred embodiment, when it is necessary to further improve the precision of ultrasonic temperature measurement and pre-tightening force measurement of S04, after step S04, the method further includes:

S05: another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape are obtained;

S06: a relative change relationship of the ultrasonic double-wave time-of-flight is obtained according to the second-order Taylor approximation as:

$$(T_S - T_{S0})/T_{S0} = \qquad \text{(III)}$$
$$K_{TS} \cdot (T - T_0) + K_{TS2} \cdot (T - T_0)^2 + K_{FS} \cdot (F - F_0) + K_{FS2} \cdot (F - F_0)^2$$

$$(T_L - T_{L0})/T_{L0} = \qquad \text{(IV)}$$
$$K_{TL} \cdot (T - T_0) + K_{TL2} \cdot (T - T_0)^2 + K_{FL} \cdot (F - F_0) + K_{FL2} \cdot (F - F_0)^2;$$

and

S07: the measured pre-tightening force F and the measured temperature T are jointly solved by means of formulas (III) and (IV).

It should be noted that in step S07, there are two sets of solutions mathematically, but usually only one set has actual physical significance in physics. This set of solutions is more accurate than the measured pre-tightening force and the measured temperature solved in step S04, and certainly, the calculation is also more complex. When the temperature change is relatively large (it may be obtained by comparing with a threshold) or the range of axial force change is relatively large (it may be obtained by comparing with a threshold), steps S05-S07 may be used to improve measurement accuracy.

The first mode wave and the second mode wave here are shear wave, longitudinal wave, surface wave, guided wave, creeping wave or combination waves of any two modes above. Commonly used are shear wave and longitudinal wave, or combination waves of shear wave and converted shear-longitudinal waves, or combination waves of longitudinal wave and converted shear-longitudinal waves.

The pre-tightening force here may be axial force, load, or stress, etc. Certainly, the stress needs to be multiplied by average cross-sectional area during calculation to keep coefficients in the formulas unchanged.

The data in step S01 may be obtained through database search, or from data record files, or by performing ultrasonic double-wave measurement once.

The data in step S03 and step S05 is obtained by searching the calibration database. $K_{TS}$, $K_{TS2}$, $K_{FS}$, $K_{FS2}$, $K_{TL}$, $K_{TL2}$, $K_{FL}$, and $K_{FL2}$ are all related to specific materials and samples, and are proportional constants that may be calibrated.

When the above method is used for regular patrol ultrasonic inspection of pre-tightening force of high-strength bolts, and measuring the pre-tightening force and/or temperature of the bolts, it may generally be searched through a database. The above formula indicates that the pre-tightening force of the bolts during inspection may be obtained only through currently measured double-wave time-of-flight and some constants. In this way, the trouble of using a thermometer to measure the temperature point by point is omitted, thereby greatly improving the efficiency of ultrasonic inspection of the pre-tightening force of the bolts.

The above method for the ultrasonic double-wave measurement of the pre-tightening force and the temperature of the solid material may further used for measuring, in a free tensile state, an axial average temperature of metal in a high-temperature state.

The above method for the ultrasonic double-wave measurement of the pre-tightening force and the temperature of the solid material may further used for temperature measurement in an ultrasonic online monitoring process of pre-tightening force of the bolts, thereby eliminating the need for platinum rhodium thermometer hardware commonly required for each bolt, and improving the temperature compensation precision of the pre-tightening force of the solid material in the method of present disclosure.

The above method for the ultrasonic double-wave measurement of the pre-tightening force and the temperature of the solid material may further be used for measuring axial average pre-tightening force and axial average temperature of a pressure vessel shell, supplemented by an appropriate axial stress model and temperature gradient model of the pressure vessel shell, and then the temperature and pressure inside a pressure vessel may be calculated.

Figure 2:
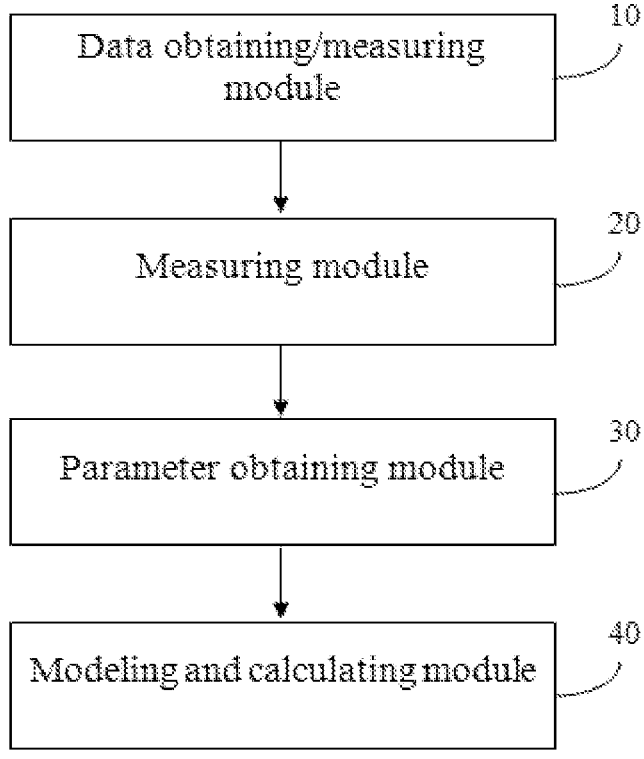
FIG. 2 is a schematic block diagram of a device for ultrasonic double-wave measurement of a pre-tightening force and temperature of a solid material of the present disclosure.

As shown in FIG. 2, the present disclosure further discloses a device for ultrasonic double-wave measurement of a pre-tightening force and temperature of a solid material, including:

a data obtaining/measuring module 10, configured to obtain a temperature $T_0$ and pre-tightening force $F_0$ of a solid material in a first state, and a first mode wave time-of-flight $T_{S0}$ and a second mode wave time-of-flight $T_{L0}$ of an ultrasonic double-wave in this state;

a measuring module 20, configured to measure the first mode wave time $T_S$ and the second mode wave time $T_L$ of the ultrasonic double-wave of the solid material in an unknown state;

a parameter obtaining module 30, configured to obtain the first mode wave temperature influence coefficient $K_{TS}$ and the second mode wave temperature influence coefficient $K_{TL}$ of the solid material, and the first mode wave pre-tightening force influence coefficient $K_{FS}$ and the second mode wave pre-tightening force influence coefficient $K_{FL}$ in the solid material to be measured having the same specification and geometric shape; and a modeling and calculating module 40, configured to obtain a relative change relationship of ultrasonic double-wave time-of-flight according to the first-order Taylor approximation as:

$$(T_S - T_{S0})/T_{S0} = K_{TS} \cdot (T - T_0) + K_{FS} \cdot (F - F_0)) \qquad \text{(I)}$$

$$(T_L - T_{L0})/T_{L0} = K_{TL} \cdot (T - T_0) + K_{FL} \cdot (F - F_0)) \qquad \text{(II)}$$

wherein, F is the measured pre-tightening force, and T is the measured temperature;

jointly solve the measured pre-tightening force F by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

and solve the measured temperature T:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

Preferably, when it is necessary to further improve the precision of the results obtained from the first-order Taylor approximation, the device may further include a precision improving module, including:

a second parameter obtaining module, configured to obtain another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape;

a second modeling and calculating module, configured to obtain a relative change relationship of ultrasonic double-wave time-of-flight according to the second-order Taylor approximation as:

$$(T_S - T_{S0})/T_{S0} = \qquad \text{(III)}$$

$$K_{TS} \cdot (T - T_0) + K_{TS2} \cdot (T - T_0)^2 + K_{FS} \cdot (F - F_0) + K_{FS2} \cdot (F - F_0)^2$$

$$(T_L - T_{L0})/T_{L0} = \qquad \text{(IV)}$$

$$K_{TL} \cdot (T - T_0) + K_{TL2} \cdot (T - T_0)^2 + K_{FL} \cdot (F - F_0) + K_{FL2} \cdot (F - F_0)^2$$

a joint solving module, configured to jointly solve the measured pre-tightening force F and the measured temperature T by means of formulas (III) and (IV). There are two sets of solutions mathematically, but usually only one set has actual physical significance in physics.

The data with a subscript of 0 may be obtained through database search, or from data record files, or by performing ultrasonic double-wave measurement once. Other constant coefficients may be obtained through calibration or from the database.

A measurement method is illustrated below by taking high-strength bolts as an example.

An ultrasonic double-wave inspection method for pre-tightening force and temperature of high-strength bolts, includes the following steps:

S01: the bolts that need to be inspected are numbered.

S02: a shear wave time-of-flight $T_{S0}$, a longitudinal wave time-of-flight $T_{L0}$, a temperature $T_0$ measured by a thermometer at that time, and a bolt pre-tightening force value $F_0$ are obtained during any previous double-wave measurement of pre-tightening force for each bolt recorded before bolt patrol inspection; and if there are no previous records, an ultrasonic double-wave method is used to measure this set of data on site.

S03: an ultrasonic shear wave time-of-flight $T_S$ and a longitudinal wave time-of-flight $T_L$ of the bolts during inspection are measured. It is assumed that during inspection, an actual temperature is T and actual pre-tightening force is F.

S04: an ultrasonic shear wave time-of-flight change $\Delta T_S = T_S - T_{S0}$ and an ultrasonic longitudinal wave time-of-flight change $\Delta T_L = T_L - T_{L0}$ of two times or two moments are calculated. The temperature change of the two times is recorded as $\Delta T = T - T_0$, and the pre-tightening force change of the two times is recorded as $\Delta F = F - F_0$.

S05: a shear wave temperature influence coefficient $K_{TS}$ and a longitudinal wave temperature influence coefficient $K_{TL}$ of the bolt material, as well as a shear wave pre-tightening force influence coefficient $K_{FS}$ and a longitudinal wave pre-tightening force influence coefficient $K_{FL}$ in a bolt to be measured having the same specification and geometric shape are searched in a bolt calibration database. These parameters are all material science parameters that may be calibrated in advance (also related to the geometric shape of the bolt and an assembly position of a nut), and perfectly satisfy the following relation under the first-order Taylor mathematical approximation:

$$\Delta T_S / T_{s0} = K_{TS} \cdot \Delta T \qquad \text{(1)}$$

$$\Delta T_L / T_{L0} = K_{TL} \cdot \Delta T \qquad \text{(2)}$$

$$\Delta T_S / T_{S0} = K_{FS} \cdot \Delta F \qquad \text{(3)}$$

$$\Delta T_L / T_{L0} = K_{FL} \cdot \Delta F \qquad \text{(4)}$$

wherein, $\Delta$ represents a difference between the quantity measured this time and the corresponding quantity obtained before the measurement.

S06: it is assumed that the relative variation of the ultrasonic double-wave time-of-flight for each specific bolt is only related to the two most significant factors: temperature and pre-tightening force changes. Therefore, a mathematical expression for the relative change in the ultrasonic double-wave time-of-flight of the specific bolt under the first-order Taylor approximation is:

$$\Delta T_S / T_{S0} = K_{TS} \cdot \Delta T + K_{FS} \cdot \Delta F \qquad (5)$$

$$\Delta T_L / T_{L0} = K_{TL} \cdot \Delta T + K_{FL} \cdot \Delta F \qquad (6)$$

the above two expressions are solved to obtain, $$\begin{bmatrix} \Delta F \\ \Delta T \end{bmatrix} = \begin{bmatrix} K_{FS} & K_{TS} \\ K_{FL} & K_{TL} \end{bmatrix}^{-1} \begin{bmatrix} \Delta T_S / T_{S0} \\ \Delta T_L / T_{L0} \end{bmatrix} \qquad (7)$$

the specific decomposition arithmetic expression is, $$\Delta F = \frac{K_{TL} \Delta T_S / T_{S0} - K_{TS} \Delta T_L / T_{L0}}{K_{TL} K_{FS} - K_{TS} K_{FL}} \qquad (8)$$

$$\Delta T = \frac{K_{FL} \Delta T_S / T_{S0} - K_{FS} \Delta T_L / T_{L0}}{K_{TS} K_{FL} - K_{TL} K_{FS}} \qquad (9)$$

and the current absolute pre-tightening force and temperature during bolt inspection are:

$$F = \frac{K_{TL} \Delta T_S / T_{S0} - K_{TS} \Delta T_L / T_{L0}}{K_{TL} K_{FS} - K_{TS} K_{FL}} + F_0 \qquad (10)$$

$$T = \frac{K_{FL} \Delta T_S / T_{S0} - K_{FS} \Delta T_L / T_{L0}}{K_{TS} K_{FL} - K_{TL} K_{FS}} + T_0. \qquad (11)$$

S07: when it is necessary to further improve the precision of ultrasonic temperature measurement and pre-tightening force measurement in S06, a relative change relationship of the ultrasonic double-wave time-of-flight is obtained according to the second-order Taylor approximation as:

$$(T_S - T_{S0}) / T_{S0} = \qquad (12)$$

$$K_{TS} \cdot (T - T_0) + K_{TS2} \cdot (T - T_0)^2 + K_{FS} \cdot (F - F_0) + K_{FS2} \cdot (F - F_0)^2$$

$$(T_L - T_{L0}) / T_{L0} = \qquad (13)$$

$$K_{TL} \cdot (T - T_0) + K_{TL2} \cdot (T - T_0)^2 + K_{FL} \cdot (F - F_0) + + K_{FL2} \cdot (F - F_0)^2$$

wherein, F is measured pre-tightening force, and T is a measured temperature. The measured pre-tightening force F and the measured temperature T are jointly solved by means of formulas (12) and (13). There are two sets of solutions mathematically, but usually only one set has actual physical significance in physics.

Below are specific embodiments for further illustration and verification.

Embodiment 1

There is a high-strength hexagonal head bolt M36X260 from a certain manufacturer, and after a nut is installed, the bolt exposes the nut by 12 mm. The known bolt material is 42CrMoA, and a calibrated temperature coefficient for this material is $K_{TS}=1.35\times10^{-4}/^\circ$ C., and $K_{TL}=9.5\times10^{-5}/^\circ$ C. Tensile force calibration of this type of bolt is performed according to a clamping length of 12 mm exposed to the nut after installation, and a calibration result is $K_{FS}=6.49\times10^{-6}/KN$, and $K_{FL}=1.68\times10^{-5}/KN$.

At a constant room temperature environment of 25° C., a first ultrasonic measurement is performed on a certain bolt that is not subjected to axial force, and the ultrasonic shear wave time-of-flight $T_{S0}=175378$ ns and the longitudinal wave time-of-flight $T_{L0}=95848$ ns are measured. The bolt temperature $T_0=25°$ C. is considered equal to the room temperature. Then a tensile testing machine is used to independently load the bolt with an axial force of F'=350 KN.

Then a second ultrasonic measurement is performed, and the ultrasonic shear wave time-of-flight $T_S=175776$ ns and the longitudinal wave time-of-flight $T_L=96410$ ns are measured. Therefore, $\Delta_{TS}=T_S-T_{S0}=398$ ns, and $\Delta_{TL}=T_L-T_{L0}=562$ ns. According to formulas (10) and (11), it may be calculated that:

$$F = 348.8 \text{ KN}$$

$$T = 25.04° \text{ C.}$$

By comparison, it may be seen that the calculated axial force value is almost consistent with the independently loaded axial force value on the tensile machine, and the calculated average temperature value of the bolt is almost consistent with the temperature measured independently by the thermometer.

Embodiment 2

There is a high-strength hexagonal head bolt M42X240 from another manufacturer, and after a nut is installed, the bolt exposes the nut by 25 mm. The known bolt material is 42CrMoA, and this material has $K_{TS}=1.35\times10^{-4}/^\circ$ C., and $K_{TL}=9.5\times10^{-5}/^\circ$ C. Tension calibration of this type of bolt is performed according to a clamping length of 25 mm exposed to the nut after installation, and a calibration result is $K_{FS}=3.67\times10^{-6}/KN$, and $K_{FL}=9.93\times10^{-6}/KN$.

At a room temperature environment, the above bolt sample is not subjected to axial tensile force, that is, $F_0=0$ KN. The bolt sample is subjected to the first ultrasonic measurement using pitch-catch technique, and the ultrasonic shear wave time-of-flight $T_{S0}=82520$ ns and the longitudinal wave time-of-flight $T_{L0}=45092$ ns are measured. The bolt surface temperature $T_0=21°$ C. is measured through a temperature sensor.

Test condition 1: then the bolt sample is placed into a constant temperature box at −25° C., at which point the bolt is actually still not subjected to axial tensile force, that is, F'=0 KN is obtained by using an independent method. The overall temperature T'=−25° C. of the bolts is independently obtained by using a temperature sensor. This independent axial force value and independent temperature value are used as a reference and comparison for later calculation results.

At this time, a second ultrasonic measurement of pitch-catch is performed, and the ultrasonic shear wave time-of-flight $T_S=81990$ ns and the longitudinal wave time-of-flight $T_L=44888$ ns are measured. Therefore, $\Delta_{TS}=T_S-T_{S0}=-530$ ns, and $\Delta_{TL}=T_L-T_{L0}=-204$ ns. According to formulas (10) and (11), the calculated result is:

$$F = -0.6 \text{ KN}$$

$$T = -26.6° \text{ C.}$$

The calculated values differ little from those independently obtained as F'=0 KN and T'=−25° C., within the allowable range.

Test condition 2: then the bolt sample is placed into a constant temperature box at about 60° C. for a period of time, at this time, the bolt is still not subjected to axial tensile force, that is, F'=0 KN is obtained by using an independent method, and measured the temperature T'=61° C. of the bolt is measured independently with a thermometer.

At this time, a third ultrasonic measurement of pitch-catch is performed, and the ultrasonic shear wave time-of-flight $T_S$=83000 ns and the longitudinal wave time-of-flight $T_L$=45282 ns are measured. Therefore, $\Delta_{TS}=T_S-T_{S0}$=480 ns, and $\Delta_{TL}=T_L-T_{L0}$=190 ns. According to formulas (10) and (11), the calculated result is:

$$F = 16.4 \text{ KN}$$

$$T = 63.6° \text{ C.}$$

The above calculated values differ little from the independently obtained values F'=0 KN and T'=61° C., which is within the allowable range.

Embodiment 3

It is a high-strength hexagonal head bolt M42X240 the same as Embodiment 2, and after a nut is installed, the bolt exposes the nut by 25 mm. The known bolt material is 42CrMoA, and this material has $K_{TS}$=1.35×10$^{-4}$/° C., and $K_{TL}$=9.5×10$^{-5}$/° C. Tensile force calibration of this type of bolt is performed according to a clamping length of 25 mm exposed to the nut after installation, and a calibration result is $K_{FS}$=3.67×10$^{-6}$/KN, and $K_{FL}$=9.93×10$^{-6}$/KN.

At a room temperature environment of 21° C., the above bolt sample is placed on a stretching table and subjected to a static axial tensile force of $F_0$=444 KN. The first pulse-echo ultrasonic measurement is performed on the bolt, the ultrasonic shear wave time-of-flight $T_{S0}$=165052 ns and the longitudinal wave time-of-flight $T_{L0}$=90472 ns are measured, and the bolt temperature is taken as the ambient temperature $T_0$=21° C.

Then the nut of the bolt sample is partially loosened, and at the same time, a heat gun is used to heat the local area in the middle of the bolt. At this time, an independent sensor of the stretching stage shows that the axial tensile force of the bolt is F'=348 KN. This independent bolt axial force is taken as a reference for the axial force value calculated by an ultrasonic method later. At this time, the temperature sensor is used to independently measure the local temperature of the heating part in the middle of the bolt, which is T'=62.6° C.

At this time, a second pulse-echo ultrasonic measurement is performed, and the ultrasonic shear wave time-of-flight $T_S$=165172 ns and the longitudinal wave time-of-flight $T_L$=90452 ns are measured. Therefore, $\Delta_{TS}=T_S-T_{S0}$=−120 ns, and $\Delta_{TL}=T_L-T_{L0}$=20 ns. By using formulas (10) and (11), it may be calculated that:

$$F = 344.3 \text{ KN}$$

$$T = 29.1° \text{ C.}$$

The calculated bolt tensile force value is not significantly different from the independent value F'=348 KN, which is within the allowable range. This embodiment demonstrates that even if there is a very uneven local temperature and sudden temperature change in the bolt, accurate changes in the bolt axial force may still be measured through the method of the present disclosure. The reason for significant difference between T and T' is that T represents the bolt average temperature measured by ultrasound, and T' represents the local temperature of a bolt heating part measured by the temperature sensor.

Embodiment 4

There is a high-strength hexagonal head bolt M42X255 from yet another manufacturer, and after a nut is installed, a clamping length is 196 mm. The known bolt material is 42CrMoA, and this material has $K_{TS}$=1.35×10$^{-4}$/° C., and $K_{TL}$=9.5×10$^{-5}$/° C. Tensile force calibration of this type of bolt is performed according to a clamping length of 196 mm after installation, and a calibration result is $K_{FS}$=3.86×10$^{-6}$/KN, and $K_{FL}$=1.05×10$^{-5}$/KN.

At a room temperature environment, the above bolt sample is not subjected to axial tensile force, that is, $F_0$=0 KN. The bolt sample is subjected to the first pulse-echo ultrasonic measurement, and the ultrasonic shear wave time-of-flight $T_{S0}$=173578 ns and the longitudinal wave time-of-flight $T_{L0}$=94860 ns are measured. The bolt surface temperature $T_0$=26.6° C. is measured through a temperature sensor.

Then the bolt is installed on a torque test bench according to the clamping length of 196 mm, and the bolt is tightened by using a hydraulic torque wrench.

There is an independent force sensor on the torque test bench used to display the current axial force of the bolt, that is, F'=634.22 KN is obtained by using an independent method. The temperature sensor currently located in the middle of a bolt rod has measured no change in the temperature of the bolt, that is, T'=26.6° C.

At this time, a second pulse-echo ultrasonic measurement is performed, and the ultrasonic shear wave time-of-flight $T_S$=174028 ns and the longitudinal wave time-of-flight $T_L$=95504 ns are measured. Therefore, $\Delta_{TS}=T_S-T_{S0}$=450 ns, and $\Delta_{TL}=T_L-T_{L0}$=644 ns. According to formulas (10) and (11), the calculated result is:

$$F = 637.8 \text{ KN}$$

$$T = 27.55° \text{ C.}$$

The calculated value is very close to the independently obtained value F'=634.22 KN, which is within the allowable range. The reason for the difference of 0.95° C. between T and T' is due to bolt torque construction method, the friction between the nut and the bolt generates heat, resulting in an increase in the local temperature of the bolt. 0.95° C. is the overall temperature variation of the bolt.

In a tightening process of the bolt with the wrench above, an ultrasonic single-wave method is simultaneously used to measure change of the ultrasonic time-of-flight in real time in the bolt tightening process, thereby achieving the goal of real-time measurement of the axial force change of the bolt. At the moment that the wrench stops, the shear wave change time is $\Delta T_{S1}=T_S-T_{S0}$=450 ns, and the longitudinal wave change time is $\Delta T_{L1}=T_L-T_{L0}$=644 ns. According to formulas (I) and (II), the bolt axial force $F_S$=671 KN and $F_L$=646 KN measured using a single shear wave and a single longitudinal wave are calculated respectively. From this, it may be concluded that the ultrasonic single-wave method in conjunction with the wrench to measure the axial force value during in the bolt pre-tightening process in real time will be affected by local temperature increase. A double-wave test is performed before and after tightening the wrench, and the axial force calculated according to formula (10) is not affected by local temperature changes. The method of combination of a single wave and a double wave is used in conjunction with the wrench, which combines the real-time performance of single-wave measurement with the accuracy of double-wave measurement.

Embodiment 5

Figure 3:
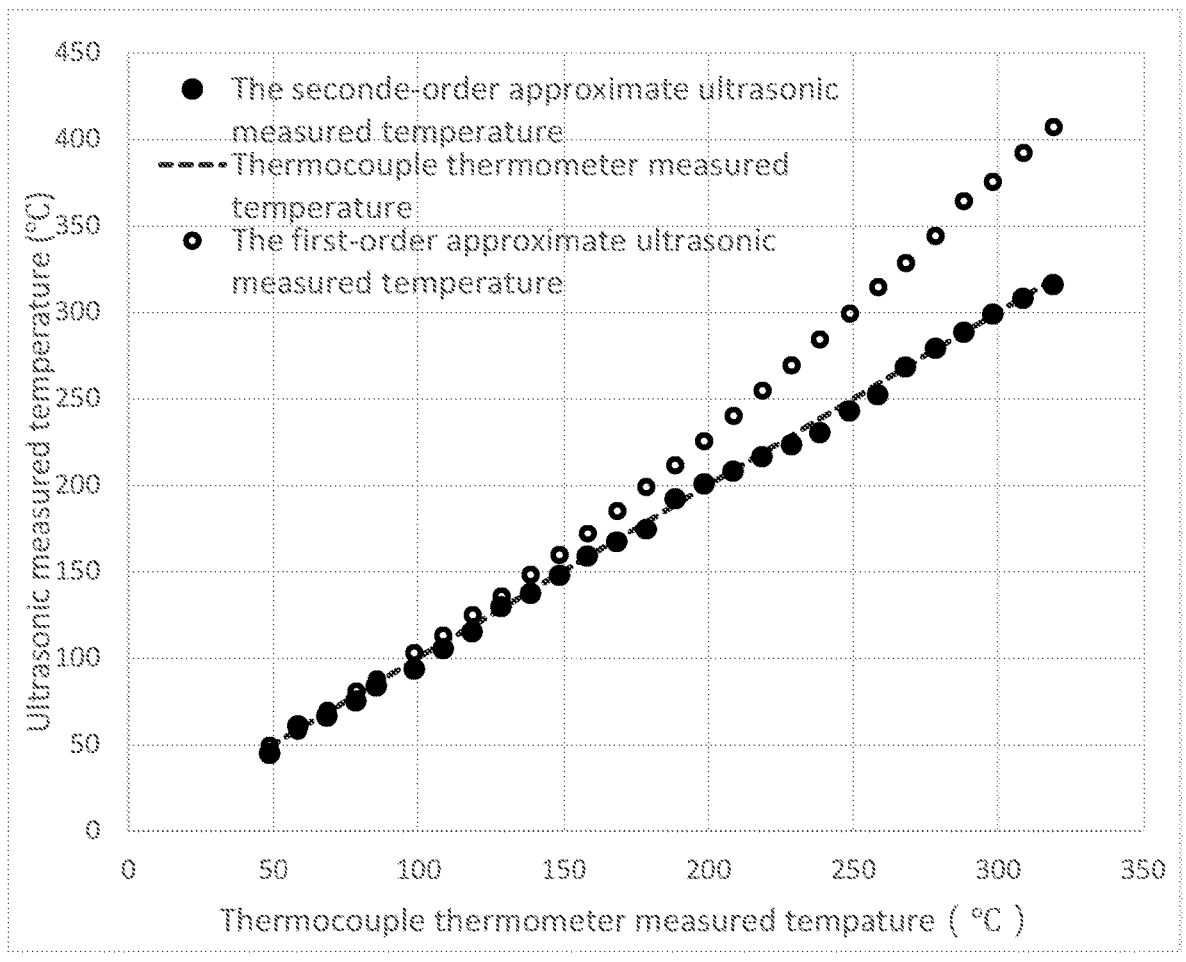
FIG. 3 is a comparison diagram between an ultrasonic measured temperature of the present disclosure and a temperature of a large range of several hundred degrees Celsius measured using a thermocouple thermometer.

A piece of iron-based high-temperature alloy with an initial temperature of 38.5° C. is heated to 350° C. and then slowly cooled. The temperature changes are measured simultaneously using a thermocouple thermometer and a high-temperature resistant electromagnetic ultrasonic double-wave device. The obtained thermocouple temperature data and first-order approximate results of ultrasonic temperature measurement are shown in FIG. 3. Due to the huge temperature change range in step S06 of the above measurement method, there is a significant deviation in the first-order Taylor approximation. In order to improve the precision of the ultrasonically measured temperature, the second-order Taylor approximation of temperature changes in step S07 is adopted, and the results are also shown in FIG. 3. After the second-order Taylor approximation of the temperature in step S07 in FIG. 3, the maximum difference between the temperature measured by ultrasonic waves and the temperature measured by the thermocouple thermometer within the range of 300 degrees Celsius does not exceed 5 degrees Celsius. This indicates that the ultrasonic double-wave measurement method of the present disclosure may independently measure the temperature of high-temperature metal in a free state over a large range.

Embodiment 6

Figure 4:
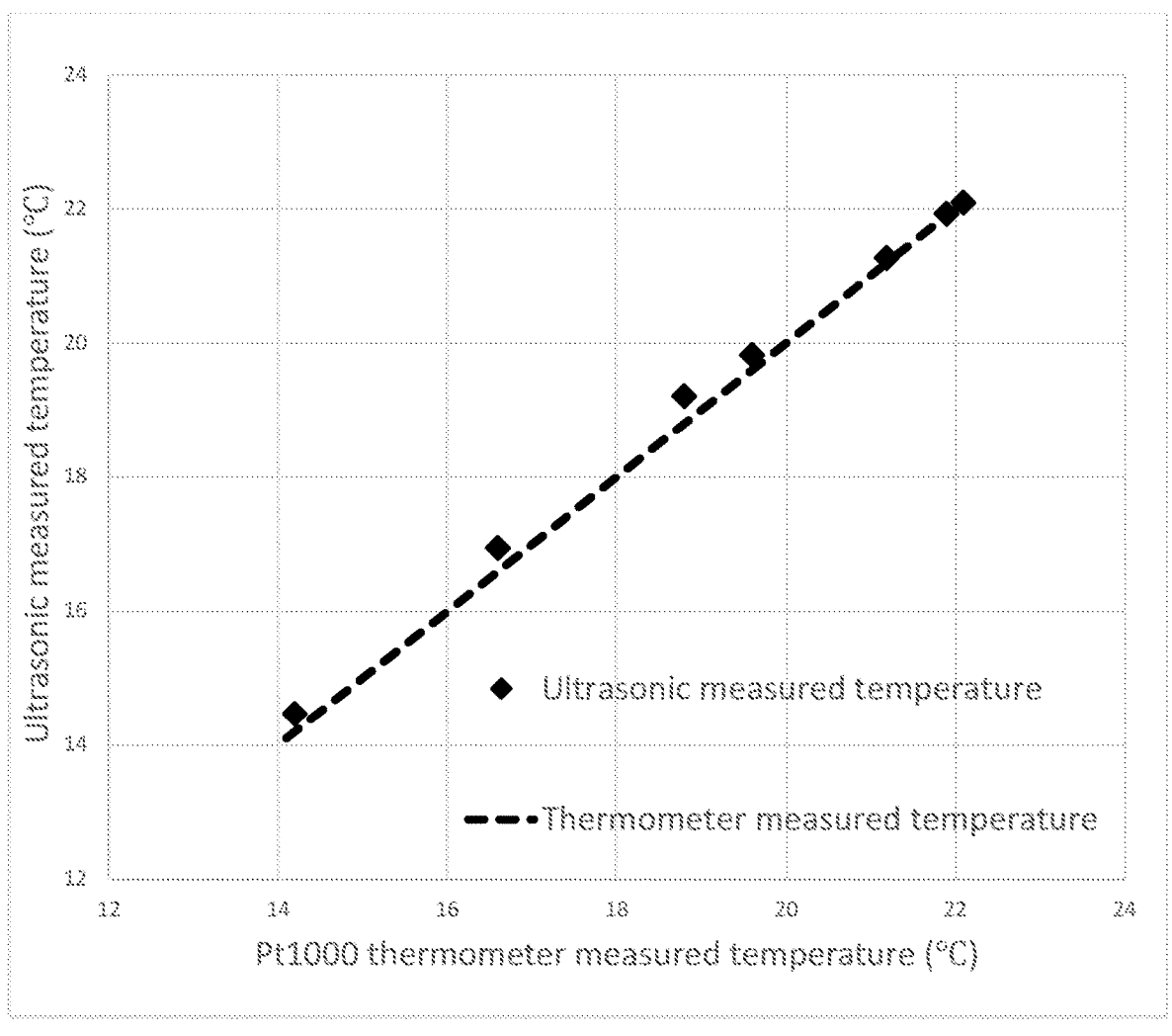
FIG. 4 is a comparison diagram between an ultrasonic measured temperature of the present disclosure and a temperature measured by a platinum rhodium thermometer, and the measured temperature is used for temperature compensation of the ultrasonic measurement of pre-tightening force of a solid material in the present disclosure.

In a hydropower station, an ultrasonic double-wave device is used to monitor the pre-tightening force of a top cover bolt. Compared to a bolt in a wind turbine tower environment, the environmental temperature change of the bolt in the hydropower station is extremely slow, which may be just used as a regular thermometer for temperature measurement comparison with the ultrasonic thermometer used in the present disclosure. FIG. 4 is a comparison of the measurement result of the ultrasonic double-wave thermometer obtained by the method of the present disclosure with the bolt temperature measured by an on-site Pt1000 thermometer. As can be seen from the figure, the bolt average temperature measured by the ultrasonic double-wave method proposed in the present disclosure is very well consistent with the temperature at a certain point on the bolt measured by an independent thermometer, or in other words, the environmental temperature. The measurement error between the two methods does not exceed 0.5 degrees Celsius within the range of 10 degrees of environmental temperature change. Due to the significant and rapid temperature changes of the bolt inside the wind turbine tower barrel, the temperature measured by the commonly used Pt1000 thermometer at a single point is difficult to accurately reflect the average temperature of the bolt. Therefore, the present disclosure also provides a reliable temperature measurement method with the single method category and convenient operation for ultrasonic online monitoring of the bolt.

It should be understood that the above specific implementations of the present disclosure are only for illustrative illustration or explanation of the principles of the present disclosure, and do not constitute a limitation on the present disclosure. Therefore, any modification, equivalent substitution, improvement and the like made without deviating from the spirit and scope of the present disclosure shall be included within the scope of protection of the present disclosure. In addition, the claims attached to the present disclosure aim to cover all variations and modified embodiments falling within the scope and boundaries of the attached claims, or equivalent forms of such scope and boundaries.

What is claimed is:

1. A method for ultrasonic double-wave measurement of a pre-tightening force and temperature of a solid material, comprising the following steps:

S01: obtaining a temperature $T_0$ and pre-tightening force $F_0$ of a solid material in a first state, and a first mode wave time-of-flight $T_{S0}$ and a second mode wave time-of-flight $T_{L0}$ of an ultrasonic double-wave in this state;

S02: measuring a first mode wave time $T_S$ and a second mode wave time $T_L$ of the ultrasonic double-wave of the solid material in an unknown state;

S03: obtaining a first mode wave temperature influence coefficient $K_{TS}$ and a second mode wave temperature influence coefficient $K_{TL}$ of the solid material, and a first mode wave pre-tightening force influence coefficient $K_{FS}$ and a second mode wave pre-tightening force influence coefficient $K_{FL}$ in the solid material to be measured having the same specification and geometric shape; and S04: obtaining a relative change relationship of ultrasonic double-wave time-of-flight according to the first-order Taylor approximation as:

$$(T_S - T_{S0})/T_{S0} = K_{TS} \cdot (T - T_0) + K_{FS} \cdot (F - F_0) \tag{I}$$

$$(T_L - T_{L0})/T_{L0} = K_{TL} \cdot (T - T_0) + K_{FL} \cdot (F - F_0) \tag{II}$$

wherein, F is the measured pre-tightening force, and T is the measured temperature;

jointly solving the measured pre-tightening force F by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

and
solving the measured temperature T:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

2. The method for the ultrasonic double-wave measurement of the pre-tightening force and the temperature of the solid material according to claim 1, after step S04, further comprising:

S05: obtaining another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape;

S06: obtaining a relative change relationship of the ultrasonic double-wave time-of-flight according to the second-order Taylor approximation as:

$$(T_S - T_{S0})/T_{S0} = \tag{III}$$
$$K_{TS} \cdot (T - T_0) + K_{TS2} \cdot (T - T_0)^2 + K_{FS} \cdot (F - F_0) + K_{FS2} \cdot (F - F_0)^2$$
$$(T_L - T_{L0})/T_{L0} = \tag{IV}$$
$$K_{TL} \cdot (T - T_0) + K_{TL2} \cdot (T - T_0)^2 + K_{FL} \cdot (F - F_0) + +K_{FL2} \cdot (F - F_0)^2;$$

and

S07: jointly solving the measured pre-tightening force F and the measured temperature T by means of formulas (III) and (IV).

3. The method for the ultrasonic double-wave measurement of the pre-tightening force and the temperature of the solid material according to claim 1, wherein the first mode wave and the second mode wave are shear wave, longitudinal wave, surface wave, guided wave, creeping wave or combination waves of any two modes above.

4. The method for the ultrasonic double-wave measurement of the pre-tightening force and the temperature of the solid material according to claim 1, wherein data in step S01 is obtained through measurement or by searching for recorded data.

5. The method for the ultrasonic double-wave measurement of the pre-tightening force and the temperature of the solid material according to claim 2, wherein data in step S03 and step S05 is obtained by searching a calibration database.

6. Using the method for the ultrasonic double-wave measurement of the pre-tightening force and the temperature of the solid material according to claim 1 for regular patrol ultrasonic inspection of pre-tightening force of high-strength bolts or online monitoring of pre-tightening force of bolts, and meanwhile measuring the pre-tightening force and temperature of the bolts.

7. Using the method for the ultrasonic double-wave measurement of the pre-tightening force and the temperature of the solid material according to claim 1 for measuring, in a free tensile state, an axial average temperature of metal in a high-temperature state.

8. Using the method for the ultrasonic double-wave measurement of the pre-tightening force and the temperature of the solid material according to claim 1 for measuring axial average pre-tightening force and an axial average temperature of a pressure vessel shell, and then calculating an internal temperature of a pressure vessel.

9. A device for ultrasonic double-wave measurement of a pre-tightening force and temperature of a solid material, comprising:

a data obtaining/measuring module, configured to obtain a temperature $T_0$ and pre-tightening force $F_0$ of a solid material in a first state, and a first mode wave time-of-flight $T_{S0}$ and a second mode wave time-of-flight $T_{L0}$ of an ultrasonic double-wave in this state;

a measuring module, configured to measure the first mode wave time $T_S$ and the second mode wave time $T_L$ of the ultrasonic double-wave of the solid material in an unknown state;

a parameter obtaining module, configured to obtain the first mode wave temperature influence coefficient $K_{TS}$ and the second mode wave temperature influence coefficient $K_{TL}$ of the solid material, and the first mode wave pre-tightening force influence coefficient $K_{FS}$ and the second mode wave pre-tightening force influence coefficient $K_{FL}$ in the solid material to be measured having the same specification and geometric shape; and a modeling and calculating module, configured to obtain a relative change relationship of ultrasonic double-wave time-of-flight according to the first-order Taylor approximation as:

$$(T_S - T_{S0})/T_{S0} = K_{TS} \cdot (T - T_0) + K_{FS} \cdot (F - F_0) \tag{I}$$

$$(T_L - T_{L0})/T_{L0} = K_{TL} \cdot (T - T_0) + K_{FL} \cdot (F - F_0) \tag{II}$$

wherein, F is the measured pre-tightening force, and T is the measured temperature;

jointly solve the measured pre-tightening force F by means of formulas (I) and (II):

$$F = \frac{K_{TL}(T_S - T_{S0})/T_{S0} - K_{TS}(T_L - T_{L0})/T_{L0}}{K_{TL}K_{FS} - K_{TS}K_{FL}} + F_0;$$

and solve the measured temperature T:

$$T = \frac{K_{FL}(T_S - T_{S0})/T_{S0} - K_{FS}(T_L - T_{L0})/T_{L0}}{K_{TS}K_{FL} - K_{TL}K_{FS}} + T_0.$$

10. The device for the ultrasonic double-wave measurement of the pre-tightening force and the temperature of the solid material according to claim 9, further comprising a precision improving module, comprising:

a second parameter obtaining module, configured to obtain another temperature influence coefficient $K_{TS2}$ of the first mode wave and another temperature influence coefficient $K_{TL2}$ of the second mode wave of the solid material, and another pre-tightening force influence coefficient $K_{FS2}$ of the first mode wave and another pre-tightening force influence coefficient $K_{FL2}$ of the second mode wave in the solid material to be measured having the same specification and geometric shape;

a second modeling and calculating module, configured to obtain a relative change relationship of ultrasonic double-wave time-of-flight according to the second-order Taylor approximation as:

$$(T_S - T_{S0})/T_{S0} = \tag{III}$$
$$K_{TS} \cdot (T - T_0) + K_{TS2} \cdot (T - T_0)^2 + K_{FS} \cdot (F - F_0) + K_{FS2} \cdot (F - F_0)^2$$
$$(T_L - T_{L0})/T_{L0} = \tag{IV}$$
$$K_{TL} \cdot (T - T_0) + K_{TL2} \cdot (T - T_0)^2 + K_{FL} \cdot (F - F_0) + K_{FL2} \cdot (F - F_0)^2;$$

a joint solving module, configured to jointly solve the measured pre-tightening force F and the measured temperature T by means of formulas (III) and (IV).

* * * * *